United States Patent
Öttinger et al.

(10) Patent No.: US 10,981,834 B2
(45) Date of Patent: Apr. 20, 2021

(54) PLASTIC COMPONENT COMPRISING A CARBON FILLER

(71) Applicant: SGL CARBON SE, Wiesbaden (DE)

(72) Inventors: Oswin Öttinger, Meitingen (DE); Dominik Rivola, Meitingen (DE); Jürgen Bacher, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 68 days.

(21) Appl. No.: 15/778,303

(22) PCT Filed: Nov. 24, 2016

(86) PCT No.: PCT/EP2016/078745
§ 371 (c)(1),
(2) Date: May 23, 2018

(87) PCT Pub. No.: WO2017/089500
PCT Pub. Date: Jun. 1, 2017

(65) Prior Publication Data
US 2018/0346384 A1    Dec. 6, 2018

(30) Foreign Application Priority Data
Nov. 24, 2015    (DE) ................ 10 2015 223 238.7

(51) Int. Cl.
| | | |
|---|---|---|
| *C04B 35/52* | (2006.01) | |
| *B32B 18/00* | (2006.01) | |
| *C04B 35/532* | (2006.01) | |
| *C04B 35/626* | (2006.01) | |
| *C04B 41/48* | (2006.01) | |
| *B33Y 10/00* | (2015.01) | |
| *B29C 64/165* | (2017.01) | |
| *C04B 41/83* | (2006.01) | |
| *C04B 41/00* | (2006.01) | |

(52) U.S. Cl.
CPC .......... *C04B 35/522* (2013.01); *B29C 64/165* (2017.08); *B32B 18/00* (2013.01); *B33Y 10/00* (2014.12); *C04B 35/532* (2013.01); *C04B 35/6269* (2013.01); *C04B 41/009* (2013.01); *C04B 41/488* (2013.01); *C04B 41/4823* (2013.01); *C04B 41/4853* (2013.01); *C04B 41/83* (2013.01); *C04B 2235/3427* (2013.01); *C04B 2235/422* (2013.01); *C04B 2235/424* (2013.01); *C04B 2235/425* (2013.01); *C04B 2235/528* (2013.01); *C04B 2235/5296* (2013.01); *C04B 2235/5427* (2013.01); *C04B 2235/5463* (2013.01); *C04B 2235/608* (2013.01); *C04B 2235/6026* (2013.01); *C04B 2235/616* (2013.01); *C04B 2237/363* (2013.01)

(58) Field of Classification Search
CPC ..... B29C 64/165; B29C 44/332; B29C 64/00; B29C 64/10; B29C 64/106; B29C 64/112; B29C 64/124; B29C 64/153; B29C 64/171; B29C 64/176; C08K 3/04; B23Q 7/00; C04B 35/522; C04B 35/532; C04B 35/6269; C04B 41/009; C04B 41/4823; C04B 41/4853; C04B 41/488; C04B 41/83; B33Y 10/00; B32B 18/00
See application file for complete search history.

(56) References Cited

U.S. PATENT DOCUMENTS

| | | |
|---|---|---|
| 4,366,191 A | 12/1982 | Gistinger et al. |
| 4,605,581 A | 8/1986 | Stevens et al. |
| 5,124,397 A | 6/1992 | Kanazawa et al. |
| 5,204,055 A * | 4/1993 | Sachs ............ B05C 19/04 419/2 |
| 2003/0044614 A1 | 3/2003 | Norley et al. |
| 2005/0003200 A1 | 1/2005 | Norley et al. |
| 2008/0067477 A1 | 3/2008 | Hayakawa et al. |

FOREIGN PATENT DOCUMENTS

| | | |
|---|---|---|
| BG | 407 Y1 | 7/2000 |
| DE | 2706033 A1 | 8/1978 |
| JP | H05331314 A | 12/1993 |
| JP | 2011068125 A | 4/2011 |
| WO | 2015/038260 A2 | 3/2015 |
| WO | 2016/08618 A1 | 6/2016 |

OTHER PUBLICATIONS

Iizuka et al., JP 2011/068125 A, machine translation, Apr. 7, 2011, entire machine translation (Year: 2011).*
International Search Report and written Opinion dated May 18, 2017 of corresponding International application No. PCT/EP2016/078745; 17 pgs.
Jooho Moon et al: "Fabrication of functionally graded reaction infiltrated SiC—Si composite by three-dimensional Printing (3DP(TM)) process", Materials Science and Engineering: A, vol. 298, No. 1-2, Jan. 1, 2001 (Jan. 1, 2001), Amsterdam, NL, pp. 110-119; 10 pgs.

(Continued)

*Primary Examiner* — Stella K Yi
(74) *Attorney, Agent, or Firm* — Maier & Maier, PLLC

(57) ABSTRACT

A composite material containing carbon and a plastic includes: a) provision of a pulverulent composition with one or more components of amorphous carbon, graphite and mixed forms thereof, b) provision of a liquid binder, c) planar deposition of a layer consisting of the material provided in step a) and local deposition of droplets of material provided in step b) onto this layer and any number of repetitions of step c), the local deposition of the droplets in the successive repetitions of this step being adapted according to the desired shape of the component to be produced, d) at least partial curing or drying of the binder to obtain a green body that has the desired shape of the component, e) impregnation of the green body with a liquid synthetic resin and f) curing of the synthetic resin to produce a synthetic resin matrix.

10 Claims, No Drawings

(56) References Cited

OTHER PUBLICATIONS

Kaushik Alayavalli et al: "Fabrication of modified graphite bipolar plates by indirect selective laser sintering (SLS) for direct methanol fuel cells", Rapid Prototyping Journal, vol. 16, No. 4, Jun. 15, 2010 (Jun. 16, 2010), GB, pp. 268-274, 9 pgs.
Product Catalog "ZPrinter® 450", Contex®, 2007, www.contex.com/3dprint, 6 pages.

\* cited by examiner

PLASTIC COMPONENT COMPRISING A CARBON FILLER

FIELD

The present invention relates to a three-dimensional component consisting of a composite material containing carbon particles in a plastics matrix, to a method for producing the component, and to the use of the component.

BACKGROUND

Sliding bodies are used in all situations in which at least two machines or device parts are faced with the technical problem of achieving as low a frictional resistance as possible, contacting one another at a particular contact pressure, and moving relative to one another. In movements of this kind, the wear that occurs on the frictional surfaces and the frictional heat that is produced thereon should be kept to a minimum. Examples of such applications are shut-off slide valves or rotary slide valves in pumps and compressors, slide bearings, end-face seals, or brushes and shoes for transmitting electric currents. In situations in which it is ensured that the parts moving relative to one another are sufficiently lubricated, it is not difficult to select suitable materials for the parts sliding on one another. However, operating states very often occur in which, as is the case when machines are starting up or coming to a stop, there is a limited period during which there is not sufficient lubrication, or in which operation has to take place without any lubrication at all and dry-running occurs.

For these specific applications, sliding bodies are used that contain self-lubricating substances, such as graphite or molybdenum sulphide. However, the lubricity of the majority of these "dry lubricants" is only sufficient if an additional thin layer of moisture can be formed, which layer draws from the moisture content of the surrounding atmosphere, for example. If this is also no longer the case, as is the case during operation in very dry air, in media that have been dried to a high degree, under a vacuum, at high altitudes or at high temperatures, the requirements are also no longer met by the aforementioned self-lubricating materials and further measures are required.

EP 0 915 129 B1 describes sliding materials which consist of a graphite particle/plastics matrix composite material and are produced by injection moulding. In said document, the surfaces of all of the fillers, i.e. also the graphite particles, in the sliding material body are coated with a resin binder, which also forms the matrix.

The properties that are essential in the applications mentioned, such as thermal conductivity and electrical conductivity, are therefore not particularly high.

The object of the present invention is therefore to provide a component which has improved properties in terms of thermal conductivity and electrical conductivity and which can take on any complex structures, such as cavities, for example cooling channels, and undercuts, but which still meets the requirements of mechanical stability and which can at the same time be produced in a simple and cost-effective manner.

SUMMARY

This object has been achieved by means of a porous carbon body in a plastics matrix that is produced by means of 3D printing.

One aspect of the present invention is a method for producing a three-dimensional component consisting of a composite material containing carbon and plastics material, which method comprises the following steps:

a) providing a powdered composition comprising one or more constituents selected from the group consisting of amorphous carbon, graphite and hybrid forms thereof, b) providing a liquid binder, c) planarly depositing a layer of the material provided in a) and locally depositing droplets of the material provided in b) on said layer, and repeating step c) any number of times, the step of locally depositing the droplets in subsequent repetitions of said step being adjusted according to the desired shape of the component to be produced, d) at least partially hardening or drying the binder and obtaining a green body that has the desired shape of the component, e) impregnating the green body with a liquid synthetic resin, and f) hardening the synthetic resin so as to form a synthetic resin matrix.

Repeating step c) any number of times should be understood to mean that the steps of planarly depositing a layer of the material provided in a) and of locally depositing droplets of the material provided in b) on said layer are repeated as many times as desired.

In the context of the present invention, obtaining a green body that has the desired shape of the component should be understood to mean the following. After the binder has been hardened or dried, the green body is still surrounded by bulk powder, also referred to as a powder bed, consisting of loose particles of the powdered composition. Therefore, the green body has to be removed from the bulk powder, or separated from the loose, unbound particles. In literature relating to 3D printing, this is also referred to as "unpacking" the printed component. After the green body has been unpacked, it may be (finely) cleaned so as to remove adherent particle residues. Unpacking can be carried out, for example, by sucking up the loose particles using a heavy-duty suction device. However, the manner in which unpacking is carried out is not particularly limited and all known methods can be used.

According to a preferred embodiment of the method according to the invention, step d) comprises carbonising the green body at a temperature of between 500° C. and 1300° C. This can take place both before and after the green body has been obtained, i.e. at a time when the green body is still in the powder bed. Although the variant mentioned last is more complex, it is necessary when thermoplastic binders that are liquid at room temperature are used, for example pitch. The carbonisation results in the binder of the green body being converted into carbon, as a result of which a continuous network of carbon extends through the entire component. This leads to improved properties in terms of thermal conductivity and electrical conductivity.

Step d) preferably comprises graphitising the green body at a temperature of at least 2000° C., more preferably at least 2400° C. Here too, the temperature treatment can take place both before and after the green body has been obtained. This leads to even higher values for the thermal conductivity and electrical conductivity. If the green body is subject to this graphitisation, the aforementioned carbonisation automatically takes place when said body is being heated to the selected graphitisation temperature. Therefore, carbonisation and graphitisation are preferably carried out in one step for economical reasons; however, they can also be carried out separately.

In order to obtain a more compact carbon network and thus further increase the thermal conductivity and electrical conductivity, the amount of the liquid binder applied in step c) can be increased, for example. However, this is relatively time-consuming and thus costly. Instead, it is preferable for the green body to be subject to a recompaction process on one or multiple occasions between steps d) and e), which process comprises the following steps:

d1) impregnating the green body with a carbon source, d2) carbonising the green body at a temperature of between 500° C. and 1300° C. In the context of the present invention, a carbon source should be understood to mean a substance which forms a carbon residue when heated to 800° C. with the elimination of oxidising substances, the mass of which residue is at least 20% of the mass (the dry mass in the case of solutions) of the substance used. Preferred carbon sources are phenolic resins, furan resins, sugar or pitch. Said carbon sources can also be used as solutions, as is necessary in the case of sugar for example. The recompaction steps d1) and d2) can also be carried out in situ, for example by means of chemical vapor infiltration (CVI), a hydrocarbon gas being used as the carbon source, and the vapour phase deposition typically taking place at approximately 700° C. to 1300° C. Finally, it is more preferable for the green body to be graphitised, following recompaction, at a temperature of at least 2000° C., more preferably at least 2400° C.

When carbon particles are mentioned in the following, it is the constituents of the powdered composition according to the invention that are being referred to. The carbon particles that are used are not particularly limited. According to the invention, they include amorphous carbon, graphite and all hybrid forms thereof. Hybrid forms should be understood to mean types of carbon of which the carbon structure is amorphous in part and graphitised in part. The carbon particles preferably comprise acetylene coke, flexicoke, fluid coke, shot coke, hard coal tar pitch coke, petroleum coke, carbon black coke, anthracite, synthetic graphite, spheroidal graphite, microcrystalline natural graphite, carbonised ion-exchange resin beads or a coke granulate, the particles more preferably consisting of said substances or a mixture thereof. By contrast, less preferable are macrocrystalline natural graphite (flake graphite) and carbons and graphites based on needle cokes, since these materials are usually present in a particle form that is unfavourable for 3D printing. All types of coke can be carbonised or graphitised as green coke, i.e. treated with high temperatures of above 500° C. or above 2000° C., respectively. The same applies to anthracite. However, the types of coke are preferably in the form of carbonised coke or graphitised coke, since these contain fewer volatile substances and have a low degree of thermal expansion. The aforementioned preferred types of coke are therefore advantageous because the particles thereof are approximately spherical, i.e. round, in terms of the shape factor (width/length). This leads to improved processability in the 3D printing process, and to more homogenous and isotropic properties of the 3D-printed components.

Acetylene coke, flexicoke, fluid coke and shot coke are also particularly preferred because they are more resistant to wear than graphite as a result of being harder. Moreover, these types of coke are therefore advantageous because the particles thereof have an approximately spherical shape, i.e. are round. This leads to further improved processability in the 3D printing process, and to more homogenous and isotropic properties of the 3D-printed components. In this respect, acetylene coke is most preferable because it has fewer impurities and has a particularly spherical shape.

Therefore, acetylene coke is also most preferable because this type of coke is particularly pure. The ash value is approximately 0.01%, and the content of metal impurities, such as Na, Ni, Fe and V, is typically well below 50 ppm. By contrast, flexicoke has an ash value of approximately 1%. The content of the above-mentioned metal impurities is in the range of several 100 ppm to more than 1000 ppm. Many of these impurities have a catalytic effect on the oxidation behaviour of the material. Impurities, such as nickel oxide, in cokes having a high impurity content of greater than 0.1% should in fact be classified as carcinogenic (category 1A), as a result of which handleability, processability and the use of cokes having a high impurity content are significantly limited.

Fluid coke and flexicoke are based on crude oil processing. After crude oil has been subject to atmospheric and vacuum distillation, the residue is coked by means of fluid coking or flexicoking, the two processes typically being carried out in a continuous fluid bed, which results in generally spherical particles. Acetylene coke is obtained in acetylene production as a waste product which is initially green, i.e. is a volatile constituent, which is described for example in DE 29 47 005 A1. Shot coke is an isotropic type of coke of which the particles are approximately spherical and are structured in part in the manner of an onion skin (see: Paul J. Ellis, "Shot Coke", Light Metals, 1996, pages 477-484).

Carbon black coke is produced by coking a mixture of carbon black and pitch and then grinding said mixture. Since the carbon black particles themselves are very small, namely generally in the nanometre range, ground carbon black coke particles automatically have an approximately round geometry having isotropic properties.

If synthetic graphite is used, fine-grain graphite is preferred owing to its low anisotropy. As in the case of carbon black coke, the particles of ground fine-grain graphite also automatically have an approximately round geometry.

Spheroidal graphite is based on natural graphite and is a granulate of natural graphite flakes together with a binder. This graphite also has an approximately spherical geometry. Spheroidal graphite is particularly preferred when the component is intended to have a particularly high thermal conductivity. The spheroidal graphite is preferably present in a carbonised form, more preferably in a graphitised form.

Coke granulates should be understood to be granulates of all possible types of coke together with a polymeric binder. Granulates are therefore preferred because particles having an approximately round geometry are also obtained as a result of the granulation. These granulates can also be present in a carbonised form, more preferably in a graphitised form, and this is preferable.

Within the context of the invention, it is possible for the coke to be mixed with a liquid activator, such as a liquid, sulphuric activator. By using an activator, the hardening time and the temperature required for hardening the binder can be reduced, and the formation of dust of the powdered composition is reduced. The amount of activator is advantageously from 0.05 wt. % to 3 wt. %, preferably from 0.1 wt. % to 1 wt. %, based on the total weight of the coke and activator. If more than 3 wt. %, based on the total weight of the activator and coke, is used, the powdered composition sticks together and the flowability is reduced. If less than 0.05 wt. %, based on the total weight of the coke and activator, is used, the amount of activator that can react with the binder is too low for the desired above-mentioned advantages to be achieved.

According to a particularly preferred embodiment of the method according to the invention, the powdered composition comprises the mentioned graphite particles or graphitised coke particles, and step d) comprises carbonising the green body at a temperature of between 500° C. and 1300° C. This creates a graphitised network. This is understood to mean that graphite particles are connected to amorphous carbon bridges. These bridges have an approximately identical, advantageously high, thermal conductivity and electrical conductivity; however, they are less complex to produce in this case (as a result of lower temperatures) than when the entire green body is graphitised.

According to a preferred embodiment of the method according to the invention, the powdered composition according to step a) has a particle size (d50) of between 3 μm and 500 μm, preferably between 50 μm and 350 μm, and most preferably between 100 μm and 250 μm. In the case of smaller particle sizes, the method is costlier because more layers have to accordingly be applied. Conversely, larger particle sizes lead to correspondingly larger carbon regions in the component, which can have a negative impact on the mechanical properties. In order to achieve these particle sizes, the coke can be ground. However, in the preferred types of coke that have a relatively round shape, it is preferable for the coke not to be ground, since if they were to be ground, the advantageous round shape would be broken. In this case, therefore, the desired particle size, or the desired particle size range, is preferably obtained by sieving and by selecting a suitable sieve fraction. The term "d50" means that 50% of the particles are smaller than the indicated value. The d50 value was determined using the laser diffraction method (ISO 13320), in which a measurement device from Sympatec GmbH was used together with associated evaluation software.

According to a preferred embodiment of the method according to the invention, the particle size (d99) of the powdered composition corresponds to at most 4 times, preferably at most 3 times, particularly preferably at most 2.5 times the value of the d50 value. This results in fewer coarse particles and a narrower particle size distribution, which facilitates reliable printing and trouble-free powder application. The term "d99" means that 99% of the particles are smaller than the indicated value. In order to determine the d99 value, the same measurement method is used as for determining the d50 value.

The particles of the powdered composition in the particle size range of the d50 value have, on average, a shape factor (particle width/particle length) of at least 0.5, more preferably at least 0.6, even more preferably at least 0.7, and most preferably at least 0.8. The shape factor is understood to mean the ratio of particle width to particle length. The particle size range of the d50 value should be understood to mean the range of d50+/−10%. The shape factor was determined, as per ISO 13322-2, by means of a Camsizer device from Retsch Technology. In this process, the width and length of the particles are determined by means of a camera and an image analysis system and compared in a ratio. In the case of particularly fine powder, the shape factor may alternatively be determined using micrograph together with associated image analysis. The advantage of practically round particles is reliable 3D printing, trouble-free powder application and the lower tendency for cracks to appear during thermomechanical loading. Furthermore, it has been found that the rounder the particles, the better, i.e. higher, the work of fracture and the elongation at break of the corresponding components.

The liquid binder in step b) is not particularly limited, provided that the viscosity thereof is suitable for 3D printing. Possible binders contain phenolic resin, furan resin, cellulose, starch, sugar or silicates, in particular liquid glass. The binder can also be in the form of a solution. According to a preferred embodiment of the method according to the invention, the liquid binder in step b) comprises phenolic resin, furan resin or liquid glass, most preferably phenolic resin and furan resin, since the corresponding green bodies have a particularly high stability, and said binders only form carbon during carbonisation.

According to a preferred embodiment of the method according to the invention, the proportion of the binder in the green body according to step d) is from 2 to 35 wt. %, preferably from 3 to 25 wt. %, and most preferably from 3 to 10 wt. %, based on the total weight of the green body. The lower the binder proportion, the quicker the 3D printing method can be carried out. With these binder proportions, the green body is sufficiently stable and, at the same time, the 3D printing process is quick.

The synthetic resin forming the plastics matrix is not particularly limited. Said resin can comprise synthetic resins such as phenolic resins, furan resins, epoxy resins, polyester resins, polyurethane resins, acrylate resins, silicone resins, perfluorinated or partially fluorinated organic polymers, phenyl sulphite resins or cyanate ester resins. The synthetic resin preferably comprises phenolic resin, furan resin or epoxy resin. Phenolic resin and furan resin are distinguished by their particularly high chemical stability and temperature stability, whereas epoxy resin has a particularly high mechanical stability.

According to a preferred embodiment of the method according to the invention, the liquid binder in step b) and the liquid synthetic resin in step e) belong to the same class of resins. In this case, the liquid binder and the liquid synthetic resin can differ, for example, on account of the type and amount of a solvent that may be contained therein. However, the respective proportions that form the final binder in the green body or the final synthetic resin matrix in the component preferably have the same basic chemistry. If, for example, the liquid binder comprises a phenolic resin, the liquid synthetic resin preferably also comprises a phenolic resin. This is advantageous in terms of chemical stability and particularly when the green body, or the binder therein, is not subject to carbonisation. In the case mentioned last, it is advantageous for the binder and the plastics matrix to be chemically compatible, and this is ensured by the preferred selection of the starting materials described herein.

According to another preferred embodiment of the present invention, the type of synthetic resin is selected such that the resulting component according to the invention has an open porosity that is as low as possible. In this connection, low porosity means a porosity of at most 2%, preferably at most 0.5%, and very particularly preferably less than 0.2%. When synthetic resins are hardened, material shrinkage usually occurs, and this lead to pores or cracks in the synthetic resin matrix. Pores can be desirable, for example, when it is intended that the synthetic resin matrix be carbonised, i.e. as is the case for the above-described recompaction process, since the volatile constituents and decomposition products of the synthetic resin matrix can escape in this case through the pores, without damaging the material. Therefore, components that are impregnated with resins, for the purpose of subsequent carbonisation, typically have instead an open porosity of greater than 5%; in the majority of cases, they actually have an open porosity of approximately 10%. If it is not possible for the pyrolysis gases to escape during the carbonisation treatment, as a result of an open porosity that is too low, at worst, the material may explode or be completely covered in cracks during carbonisation. However, the synthetic resin matrix produced after the synthetic resin has been hardened is not intended to be carbonised according to the invention; instead, the component produced is intended to be the end product, it being advantageous in many applications for the material of the component to be as dense as possible and to accordingly have a low porosity. In this case, porosity in the sense of open porosity is determined in accordance with DIN 51918.

Another aspect of the present invention is a three-dimensional component which consists of a composite material containing carbon and plastics material and can be produced using the method according to the invention. The obtained carbon/plastics material composite component can be distinguished from components that can be obtained using known methods (injection moulding a carbon/plastics material mixture) in that the carbon particles are distributed in the component so as to have a high isotropy. In methods such as injection moulding, not perfectly round particles are not always oriented in the flow direction of the injection moulding compound. Other shape forming methods, such as die-pressing, also have an analogous orientation and therefore result in anisotropy. Owing to the practically pressureless layered construction of the component according to the invention, during 3D printing, a homogenous structure is obtained and the structure therefore no longer has a preferred orientation. Furthermore, the options for shaping the component by 3D printing are practically unlimited in terms of complexity.

According to a preferred embodiment of the component according to the invention, said component can be obtained according to the preferred method of the present invention, as a result of which the green body is at least carbonised, or even graphitised. By converting at least the binder into carbon, a continuous and integral carbon network is created in the component. This increases both the thermal conductivity and the electrical conductivity of the component. This applies all the more to the components which are subject to the above-described preferred recompaction process, since the amount of carbon which is located between the carbon particles and interconnects said particles is increased as a result of said process. Components of this kind cannot be produced using known methods, such as injection moulding, which has already been described. The reason for this is that corresponding carbon/plastics material composite materials which have been formed under high pressure and are therefore very dense and which have a high resin content would be destroyed when attempting to carbonise them, i.e. they would at least crack or even burst because the gaseous pyrolysis products would not be able to easily escape from the dense body.

Another aspect of the present invention is a three-dimensional component which consists of a composite material containing carbon and plastics material and which comprises between 25 and 50 wt. % of plastics matrix and between 50 and 75 wt. % of carbon in an at least partially particulate form, and the carbon particles in the particle size range of the d50 value have, on average, a shape factor (width/length) of at least 0.5, preferably at least 0.6, more preferably at least 0.7, and most preferably at least 0.8. Since this component can be produced using the method according to the invention, all the definitions or preferred embodiments mentioned in the context of the method apply similarly to said component.

According to a preferred embodiment of the component according to the invention, the powdered composition or the carbon particles is/are bound to free carbon, and therefore constitute(s) a continuous, integrally connected carbon network in the component.

According to a preferred embodiment, the component according to the invention has antistatic properties and a specific electrical resistance in the range of from $10^4$ ohm*μm to $10^7$ ohm*μm. This applies if the binder in the green body is not subject to carbonisation or graphitisation.

More preferably, the component has an electrical conductivity and a specific electrical resistance of 500 ohm*μm or less, preferably 300 ohm*μm or less, and particularly preferably 50 ohm*μm or less (determined in accordance with DIN 51911). This applies to the preferred components of which the green body, together with the binder, was carbonised or even graphitised. The advantages of this have already been discussed above.

The component according to the invention preferably has an elastic modulus in the range of from 3 to 10 GPa, preferably in the range of from 4 to 7 GPa. The elastic modulus was determined from the linear initial slope on the elastic curve from the three-point flexural test of the samples for determining the flexural strength.

The component according to the invention preferably has a strength of at least 15 MPa, preferably at least 20 MPa. The strength was determined according to the 3-point flexural method in accordance with DIN 51902.

The component according to the invention preferably has a coefficient of thermal expansion, measured in accordance with DIN 51909 between room temperature and 150° C., of at most 45 μm/(m*K), more preferably at most 30 μm/(m*K), and even more preferably at most 20 μm/(m*K).

The component according to the invention preferably has a thermal conductivity of at least 2 W/(m*K), preferably at least 10 W/(m*K), and particularly preferably at least 30 W/(m*K), the thermal conductivity being determined in accordance with DIN 51908.

The component according to the invention preferably has cavities, cooling channels or undercuts and consists overall of a uniform structure of the components or a structure of said components that gradually changes according to the desired material properties of the component.

Owing to the mentioned advantageous properties thereof, the component according to the invention is suitable for a wide range of applications. In principle, the properties are advantageous for sliding elements and electrical contacts at a temperature of preferably approximately 200° C., depending on the synthetic resin matrix used. Furthermore, the component according to the invention can be impregnated with resin such that it is liquid-tight, and this opens up other applications, such as for corrosion-resistant heat exchangers or pump housings. The chemical resistance of the material in combination with the complex component structure that can be produced can also be used expediently in static mixer elements, turbulators, and also for column fittings, such as bubble caps, filler material, packing, etc., in chemical apparatus construction, e.g. for acid handling. Turbulators are understood to be elements which are installed in pipes, for example, in order to deliberately bring about turbulent flow conditions. Another aspect of the present invention is the use of a component as an impeller and shut-off slide valve or rotary slide valve in pumps and compressors, as a pump housing, as fittings in columns, as static mixer elements, as turbulators, as an electric heating element, as an electrical contact, such as a brushes or shoes for transmitting electric currents, as a classifier wheel, as a heat exchanger or an element for a heat exchanger, as a sliding element in bearings or hinges comprising a slide bearing and end-face seal, as a cam, in gears, as a gearwheel, as a slide plate and slide tube of flexible shafts, and as a piston and piston sleeve.

The present invention is described in the following with reference to examples. When it is not explicitly stated in the following, all features mentioned in the examples can be combined with subject matter from the general description of the present application.

EXAMPLE 1

Calcinated hard coal tar pitch coke was ground and had, after grinding and sieving, a particle size distribution of d10=130 μm, d50=230 μm and d90=390 μm and an average shape factor of 0.69 (in the particle size range of d50+/−10%). The coke was first mixed with 1 wt. % of a sulphuric liquid activator for phenolic resin, based on the total weight of the coke and activator, and processed using a 3D printing powder bed machine. A scraper unit was used to apply a thin coke powder layer (approximately 0.3 mm thick) onto a planar powder bed and a type of inkjet printing unit was used to print an alcoholic phenolic resin solution onto the coke bed according to the desired component geometry. Then, the printing table was lowered by the layer thickness, another layer of coke was applied and phenolic resin was locally printed again. By the procedure being repeated, cuboid test pieces were formed that had the measurements 168 mm (length)×22 mm (width)×22 mm (height). Once the complete "component" had been printed, the powder bed was put into an oven that had been preheated to 140° C. and was kept there for approximately 6 hours. Even if a "component" has already been mentioned before this point, it goes without saying that this is not meant to refer to the finished component according to the invention. To produce said finished component, the phenolic resin was hardened and formed a dimensionally stable green body. The excess coke powder was sucked up after cooling, and the green body of the component was removed.

The density of the green body after the binder had been hardened was 0.88 g/cm$^3$. The density was determined geometrically (by weighing and determining the geometry). The green body had a resin proportion of 5.5 wt. %, which was determined by carbonisation treatment. The procedure was such that the carbon yield of the hardened resin components used was determined in advance by means of thermogravimetric analysis (TGA) as being 58 wt. %. The original resin proportion in the green body could be calculated from the loss in mass of the green body after it had been subsequently carbonised for one hour at 900° C. in a protective gas atmosphere.

The green body was subsequently impregnated with phenolic resin and carbonised again at 900° C. The density was thereby increased to 1.1 g/cm$^3$. The carbon body that had been recompacted in this manner was then subject to vacuum pressure impregnation with phenol formaldehyde resin (manufacturer: Hexion) having a viscosity of 700 mPas at 20° C. and a water content according to Karl Fischer (ISO 760) of approximately 15%. The procedure was as follows: the carbon bodies were put in an impregnating pressure cylinder. The cylinder pressure was reduced to 10 mbar, and increased to 11 bar after the resin had been introduced. After a dwell time of 10 hours, the carbon test pieces were removed from the impregnating pressure cylinder and heated to 160° C. at a pressure of 11 bar in order to harden the resin. The heating time was approximately 2 hours, and the dwell time at 160° C. was approximately 10 hours. After hardening, the cooled test pieces had a density of 1.45 g/cm$^3$ (example 1).

EXAMPLE 2

Example 2 differed from example 1 in that the recompacted carbonised carbon body was additionally subject to graphitisation treatment at 2400° C. in a protective gas atmosphere before the subsequent phenol formaldehyde impregnation. The subsequent resin impregnation carried out in the same manner as in example 1 resulted in a test piece density of 1.58 g/cm$^3$ (example 2).

EXAMPLE 3

Calcinated acetylene coke was mixed in an unground form and with a particle size distribution of d10=117 μm, d50=190 μm and d90=285 μm and an average shape factor of 0.82 (in the particle size range of d50+/−10%) with 0.35 wt. % of the liquid activator according to example 1 and processed so as to form a green body in the same manner as in example 1.

The green body had a resin proportion of 3.0 wt. %. The density of the green body was 0.98 g/cm$^3$ and was thus significantly higher than in the case of the hard coal pitch coke from example 1. Furthermore, this green body was stronger than that from example 1, which made handling easier. Therefore, it was not necessary to recompact this green body, and this reduced the production costs.

The green carbon bodies produced in this manner were subsequently subject to the resin impregnating and hardening procedure from example 1. The density of the hardened plastics material/carbon test pieces was determined as being 1.43 g/cm$^3$ (example 3).

EXAMPLE 4

Example 4 differed from example 3 in that the green carbon test pieces were impregnated with epoxy resin instead of being impregnated with phenolic resin. The procedure was as follows:

The samples were provided in a plastics container and an epoxy resin mixture which was prepared in advance and consisted of 100 parts EPR L20 resin (manufacturer: Hexion) and 34 parts EPH 960 hardener (manufacturer: Hexion) was poured thereover. A vacuum of 100 mbar was then applied to the immersed samples for one hour. Infiltration was then continued at normal air pressure for 30 minutes. The sample pieces were completely immersed in the solution for the entire infiltration time (at room temperature). After infiltration of the epoxy resin, the samples were removed and the surface thereof was cleaned using a cellulose cloth. The samples impregnated with resin were then hardened in the drying cabinet in air and at normal pressure initially for 2 hours at 100° C. and then for 3 hours at 150° C. After the resin had been hardened, the sample pieces had an average density of 1.40 g/cm$^3$ (example 4). Since epoxy resin hardens by a polyaddition reaction, there was no measurable loss in mass after the hardening step.

EXAMPLE 5

Example 5 differs from example 3 in that the green carbon test pieces were impregnated with furan resin by being immersed therein instead of being impregnated with phenolic resin. The advantage of furan resin impregnation over phenolic resin impregnation is the extremely low viscosity of the furan resin system, namely of less than 100 mPas, as a result of which simple impregnation without applying any pressure can be carried out easily. The procedure was as follows:

The samples were provided in a glass container and a solution which was prepared in advance and consisted of one part maleic acid anhydride (manufacturer: Aug. Hedinger GmbH & Co. KG) and 10 parts furfuryl alcohol (manufacturer: International Furan Chemicals B.V.) was poured thereover. The sample pieces were completely immersed in the solution for the entire infiltration time of two hours (at room temperature). After infiltration of the furfuryl alcohol/maleic acid anhydride solution, the samples were removed and the surface thereof was cleaned using a cellulose cloth. The samples impregnated with resin were then hardened in the drying cabinet. In the process, the temperature was gradually increased from 50° C. to 150° C. The actual hardening procedure was as follows: 19 hours at 50° C., 3 hours at 70° C., 3 hours at 100° C. and then 1.5 hours at 150° C. The average density of the test pieces impregnated with furan resin was determined as being 1.31 g/cm$^3$ following hardening (example 5).

A characterisation of materials was performed for all test pieces from examples 1-5. The results of these tests are summarised in the following table:

| | Example 1 (averages) | Example 2 (averages) | Example 3 (averages) | Example 4 (averages) | Example 5 (averages) |
|---|---|---|---|---|---|
| AD (g/cm$^3$) | 1.45 | 1.58 | 1.43 | 1.40 | 1.31 |
| ER (ohm$\mu$m) | 350 | 35 | 500,000 | 100,000 | 120,000 |
| YM 3p (GPa) | 6 | 6 | 6 | 6 | 5 |
| FS 3p (MPa) | 30 | 15 | 20 | 45 | 25 |
| CTE RT/150° C. ($\mu$m/(m*K)) | 27 | 12 | 24 | 40 | 24 |
| TC (W/(m*K)) | 2 | 40 | <1 | <1 | <1 |

AD (g/cm$^3$): (geometric) density in accordance with ISO 12985-1
ER (ohm$\mu$m): electrical resistance in accordance with DIN 51911
YM 3p (GPa): elastic modulus (stiffness), determined from the 3-point flexural test
FS 3p (MPa): 3-point flexural strength in accordance with DIN 51902
CTE RT/150° C. ($\mu$m/(m*K)): coefficient of thermal expansion measured between room temperature and 150° C. in accordance with DIN 51909
TC (W/(m*K)): thermal conductivity at room temperature in accordance with DIN 51908

Example 1: hard coal tar pitch coke, green body additionally impregnated with phenolic resin, carbonised at 900° C., and subsequently finally compacted by phenolic resin in the vacuum pressure impregnation process.
Example 2: hard coal tar pitch coke, green body not impregnated with phenolic resin, carbonised at 900° C., then graphitised at 2400° C., subsequently finally compacted by phenolic resin in the vacuum pressure impregnation process.
Example 3: acetylene coke, green body finally compacted directly by phenolic resin in the vacuum pressure impregnation process.
Example 4: acetylene coke, green body finally compacted directly by an epoxy resin system by means of vacuum impregnation.
Example 5: acetylene coke, green body finally compacted directly by a furan resin system by means of impregnation by immersion.

In examples 1 and 2, there is thus a continuous carbon network, since the coke particles are connected to amorphous carbon, or the graphitised coke particles are connected to carbon that is similar to graphite. By comparison with examples 3, 4 and 5, examples 1 and 2 demonstrate a significant reduction in the electrical resistance, the graphitisation of the green body (example 2) further reducing the electrical resistance. Similarly, the thermal conductivity of the components is also increased as a result of the thermal treatment.

The epoxy matrix (example 4) is stronger than phenolic resin and furan resin; however, phenolic resin and furan resin are more temperature and chemically stable. With regard to the complexity involved in the impregnation, impregnation with furan resin can occur simply by means of impregnation by immersion, whereas impregnation with phenolic resin and epoxy resin has to occur by means of a vacuum impregnation process or a vacuum pressure impregnation process, owing to the viscosity usually being higher.

The invention claimed is:

1. A method for producing a three-dimensional component consisting of a composite material containing carbon and plastics material, which method comprises the following steps:
   a) providing a powdered composition comprising one or more constituents selected from the group consisting of amorphous carbon, graphite and hybrid forms thereof,
   b) providing a liquid binder,
   c) planarly depositing a layer of the powdered composition provided in a) and locally depositing droplets of the liquid binder provided in b) on said layer, and repeating step c) any number of times, wherein the step of locally depositing the droplets in subsequent repetitions of said step is adjusted according to the desired shape of the three-dimensional component to be produced,
   d) at least partially hardening or drying the liquid binder and obtaining a green body that has the desired shape of the three-dimensional component,
   e) impregnating the green body with a liquid synthetic resin, and
   f) hardening the liquid synthetic resin so as to form a synthetic resin matrix.

2. The method according to claim 1, wherein step d) comprises carbonising the green body at a temperature of between 500° C. and 1300° C.

3. The method according to claim 1, wherein the green body is subject to a recompaction process on one or multiple occasions between steps d) and e), which process comprises the following steps:
   d1) impregnating the green body with a carbon source,
   d2) carbonising the green body at a temperature of between 500° C. and 1300° C.

4. The method according to claim 1, wherein the powdered composition comprises acetylene coke, flexicoke, fluid coke, shot coke, hard coal tar pitch coke, petroleum coke, carbon black coke, anthracite, synthetic graphite, spheroidal graphite, microcrystalline natural graphite, carbonised ion-exchange resin beads or a coke granulate.

5. The method according to claim 1, wherein the powdered composition comprises graphite particles or graphitised coke particles, and step d) comprises carbonising the green body at a temperature of between 500° C. and 1300° C.

6. The method according to claim 1, wherein the powdered composition comprises particles in a particle size range of a d50 value, on average, a shape factor (width/length) of at least 0.5.

7. The method according to claim 1, wherein the liquid binder in step b) comprises phenolic resin, furan resin or liquid glass.

8. The method according to claim 1, wherein the liquid synthetic resin is selected such that the component has a porosity of at most 2%.

9. The method according to claim 1, wherein the liquid binder in step b) and the liquid synthetic resin in step e) belong to the same class of resins.

10. The three-dimensional component which consists of a composite material containing carbon and plastics material and is produced using a method according to claim 1.

* * * * *